(12) United States Patent
Osugi

(10) Patent No.: US 10,705,650 B2
(45) Date of Patent: Jul. 7, 2020

(54) INFORMATION PROCESSING APPARATUS AND DISPLAY SYSTEM

(71) Applicant: DENSO CORPORATION, Kariya, Aichi-pref. (JP)

(72) Inventor: Takuya Osugi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 21 days.

(21) Appl. No.: 16/093,408

(22) PCT Filed: Apr. 14, 2017

(86) PCT No.: PCT/JP2017/015323
§ 371 (c)(1),
(2) Date: Oct. 12, 2018

(87) PCT Pub. No.: WO2017/179709
PCT Pub. Date: Oct. 19, 2017

(65) Prior Publication Data
US 2019/0121485 A1  Apr. 25, 2019

(30) Foreign Application Priority Data

Apr. 15, 2016  (JP) ................... 2016-082232

(51) Int. Cl.
*G06F 3/041* (2006.01)
*G06F 3/01* (2006.01)

(52) U.S. Cl.
CPC ............ *G06F 3/0416* (2013.01); *G06F 3/013* (2013.01); *G06F 3/041* (2013.01)

(58) Field of Classification Search
CPC ......... G06F 3/0416; G06F 3/041; G06F 3/013
See application file for complete search history.

(56) References Cited

U.S. PATENT DOCUMENTS

2014/0361996 A1* 12/2014 Eden ...................... G06F 3/013
345/173
2015/0205437 A1  7/2015 Takahashi et al.
(Continued)

FOREIGN PATENT DOCUMENTS

JP  H11296304 A  10/1999
JP  2009110275 A  5/2009
(Continued)

*Primary Examiner* — Kent W Chang
*Assistant Examiner* — Andrew Lee
(74) *Attorney, Agent, or Firm* — Harness, Dickey & Pierce, P.L.C.

(57) ABSTRACT

An information processing apparatus includes a position acquisition section, a point of gaze acquisition section, an amendment section, and a determination section. The position acquisition section acquires an input position to a touch panel. The point of gaze acquisition section acquires a point of gaze of a manipulator. The determination section determines whether the input position and the point of gaze satisfy at least one amendment condition. In cases that the determination section determines that the amendment condition is satisfied, the amendment section amends the input position based on the point of gaze. In cases that the determination section does not determine that the amendment condition is satisfied, the amendment section amends the input position by reducing a degree of an influence of the point of gaze as compared with the cases that the determination section determines that the amendment condition is satisfied.

8 Claims, 6 Drawing Sheets

(56) References Cited

U.S. PATENT DOCUMENTS

2015/0253753 A1* 9/2015 Bennett ................ G06F 3/0488
  700/83
2015/0277599 A1* 10/2015 Cho ..................... G06F 3/0418
  345/173
2016/0224109 A1* 8/2016 Lee ........................ G06F 3/005
2016/0379466 A1* 12/2016 Payant .................. G08B 21/24
  340/457

FOREIGN PATENT DOCUMENTS

| JP | 2015114682 A | 6/2015 | |
|----|--------------|--------|---|
| JP | 2015153277 A | 8/2015 | |
| JP | 2015176429 A | 10/2015 | |
| WO | WO-2015037767 A1 * | 3/2015 | ........... G06F 3/0482 |

* cited by examiner

INFORMATION PROCESSING APPARATUS AND DISPLAY SYSTEM

CROSS REFERENCE TO RELATED APPLICATIONS

This application is a U.S. National Phase Application under 35 U.S.C. 371 of International Application No. PCT/JP2017/015323 filed on Apr. 14, 2017. This application is based on and claims the benefit of priority from Japanese Patent Application No. 2016-082232 filed on Apr. 15, 2016. The entire disclosures of all of the above applications are incorporated herein by reference.

TECHNICAL FIELD

The present disclosure relates to an information processing apparatus which performs a predetermined control based on an input to a touch panel.

BACKGROUND ART

A touch panel is provided with a translucent sensor, which is arranged on a display surface of a display so as to detect a position which a manipulator touches. The position touched by the manipulator is slightly separate from the display surface in the direction of the normal line of the display. Therefore, in cases that the manipulator is located to be slanted to the normal line of the display, a separation may arise between the displayed image by the display and the touched position, possibly failing to detect an intended input manipulation.

Patent literature 1 proposes a technology which detects a position of a manipulator and amends an input position depending on the detected position.

PRIOR ART LITERATURES

Patent Literature

Patent literature 1: JP 2015-153277 A

SUMMARY OF INVENTION

The inventor's detailed study finds an issue in the above technology such that an input position may not be appropriately amended only based on the position of the manipulator, possibly posing an incorrect operation in the touch panel.

The present disclosure has a first aspect to provide preferably a technology that reduces an incorrect operation in a touch panel. According to the first aspect of the present disclosure, an information processing apparatus is provided to include a position acquisition section, a point of gaze acquisition section, an amendment section, and a determination section. The position acquisition device is configured to acquire an input position to a touch panel arranged in a display screen of a display apparatus which displays an image. The point of gaze acquisition section is configured to acquire a point of gaze of a manipulator who performs an input manipulation to the touch panel. The amendment section is configured to perform an amendment of the input position to the touch panel. The determination section is configured to determine whether at least one predetermined amendment condition is satisfied by the input position acquired by the position acquisition section and the point of gaze acquired by the point of gaze acquisition section.

In a case that the determination section determines that the at least one amendment condition is satisfied, the amendment section is configured to perform an amendment of the input position at least based on the point of gaze. In a case that the determination section does not determine that the at least one amendment section is satisfied, the amendment section is configured to perform an amendment of the input position by reducing a degree of an influence of the point of gaze as compared with the case that the determination section determines that the at least one amendment condition is satisfied.

According to such a configuration, when the at least one amendment condition is satisfied, the amendment of the input position is made based on the point of gaze. This can suppress an occurrence of an input not intended by the manipulator. In addition, when the at least one amendment condition is not satisfied, the influence of the point of gaze is reduced. This can suppress an execution of an amendment based on the point of gaze when such an amendment based on the point of gaze is not appropriate, while suppressing an occurrence of an input not intended by the manipulator.

According to a second aspect of the present disclosure, a display system is provided to include: a display apparatus configured to display an image; a touch panel arranged to a display screen of the display apparatus; a point of gaze detection apparatus configured to detect a point of gaze of a manipulator who performs an input manipulation to the touch panel; and an information processing apparatus configured to execute a predetermined control according to an input manipulation to the touch panel.

The information processing apparatus includes a position acquisition section, a point of gaze acquisition section, an amendment section, and a determination section. The position acquisition section is configured to acquire an input position to the touch panel based on a signal outputted from the touch panel. The point of gaze acquisition section is configured to acquire the point of gaze based on a signal outputted from the point of gaze detection apparatus. The amendment section is configured to perform an amendment of the input position to the touch panel. The determination section is configured to determine whether at least one predetermined amendment condition is satisfied by the input position acquired by the position acquisition section and the point of gaze acquired by the point of gaze acquisition section.

In a case that the determination section determines that the at least one amendment condition is satisfied, the amendment section is configured to perform an amendment of the input position at least based on the point of gaze. In a case that the determination section does not determine that the at least one amendment section is satisfied, the amendment section is configured to perform an amendment of the input position by reducing a degree of an influence of the point of gaze as compared with the case that the determination section determines that the at least one amendment condition is satisfied.

Such a configuration according to the second aspect includes an information processing apparatus similar to the information processing apparatus according to the first aspect to the present disclosure. Similarly to the information processing apparatus according to the first aspect, the configuration according to the second aspect can suppress an occurrence of an input not intended by the manipulator.

Further, reference signs in parenthesis in Claims, which indicate correspondence relation with specific elements described in embodiments mentioned later as examples, do not limit a technical scope of the present disclosure.

EMBODIMENTS FOR CARRYING OUT INVENTION

The following explains embodiments for performing the present disclosure with reference to the drawings.

1. Embodiment

1-1. Configuration

Figure 1:
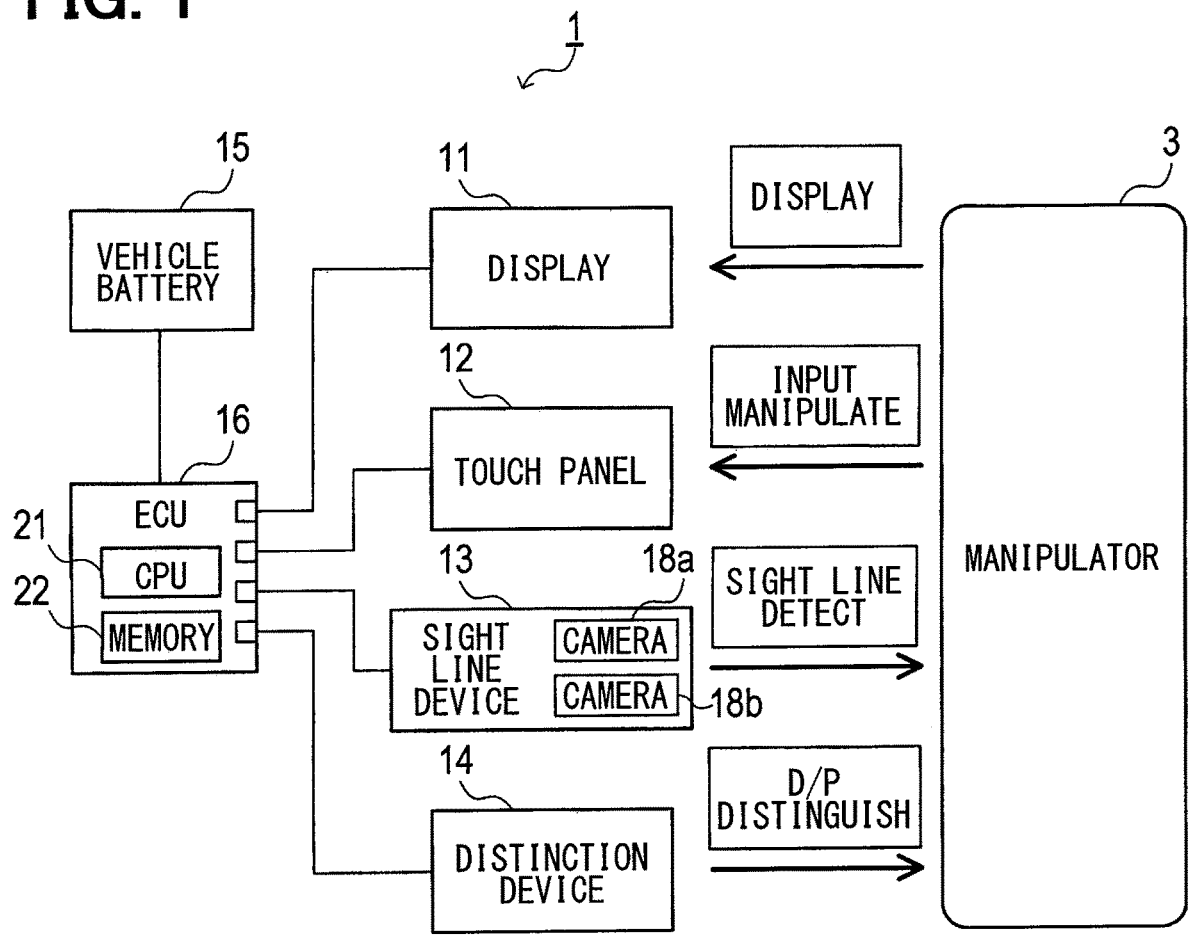
FIG. 1 is a block diagram illustrating a configuration of a display system.

FIG. 1 illustrates a display system 1, which is a system mounted in a vehicle such as an automobile to be used. The display system 1 includes a display 11, a touch panel 12, a sight line detection device 13, a distinction device 14, a vehicle battery 15, and an electronic control unit (hereinafter, ECU) 16. Furthermore, the ECU 16 is equivalent to an information processing apparatus.

The display 11 is a display apparatus having a display screen to display an image, such as a liquid crystal or an organic electroluminescence; the display 11 displays an image according to a signal inputted from the ECU 16. The touch panel 12 is an input apparatus having a sensor, which is arranged to be overlapped on a display surface of the display 11 to transmit a light; the input apparatus receives an input manipulation to the sensor. The present embodiment employs a touch panel of a capacitive sensing type. The touch panel 12 receives, as an input, a touch manipulation by a manipulator 3 and outputs an input signal to the ECU 16.

The sight line detection device 13 includes a camera 18a which captures an image of a driver, and a camera 18b which captures an image of a passenger. The sight line detection device 13 applies an image analysis to the image acquired from the cameras, and detects a point of eye, a sight line, and a point of gaze of the manipulator 3 who performs an input manipulation to the touch panel 12, as detection results. The sight line detection device 13 calculates the detection results with predetermined time intervals, to output to the ECU 16. The method detecting the point of eye, the sight line, and the point of gaze through the image analysis may employ a well-known technology. It is noted that the passenger signifies, in particular, an occupant sitting in a passenger seat. This sight line detection device 13 is equivalent to a point of gaze detection apparatus.

Figure 2:
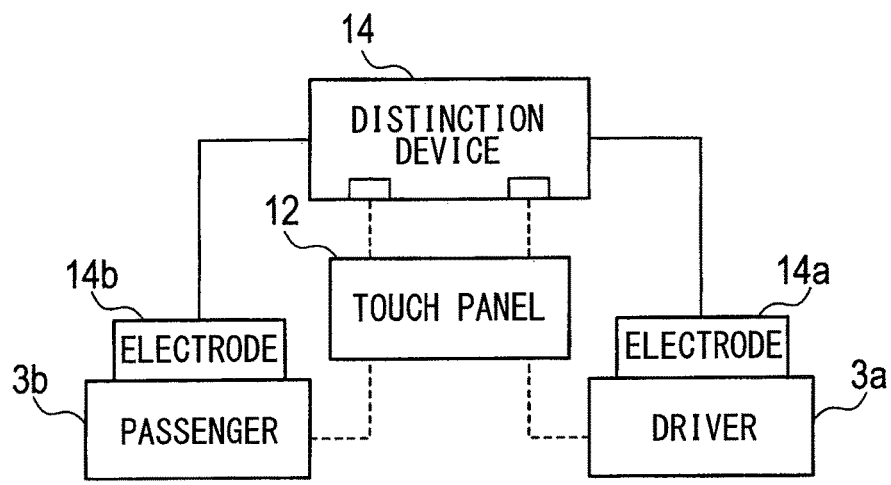
FIG. 2 is a block diagram illustrating a configuration of a distinction device.

The distinction device 14 has capacitive coupling type electrodes 14a and 14b, respectively, installed in a driver seat and a passenger seat, as illustrated in FIG. 2. When a driver 3a seated in the driver seat manipulates the touch panel 12, the circuit configured by the touch panel 12, the driver 3a, the capacitive coupling type electrode 14a, and the distinction device 14 is tuned into ON state. Thereby, the manipulator of the touch panel 12 is distinguished to be the driver 3a. Similarly, when the circuit for the passenger 3b is turned into ON state, the manipulator of the touch panel 12 is distinguished to be the passenger 3b. The distinguished result is outputted to the ECU 16.

The explanation is returned to FIG. 1. The vehicle battery 15 provides the electric power to the ECU 16. The ECU 16 includes a microcomputer containing a CPU 21 and semiconductor memory (hereinafter, memory 22) such as a RAM, a ROM, and a flash memory. The ECU 16 has the various kinds of functions that are achieved by the CPU 21 executing the program stored in the non-transitory tangible storage medium. In this example, the memory 22 corresponds to a non-transitory tangible storage medium which stores a program. In addition, a method corresponding to the program is executed by executing the program. Note that the ECU 16 may include a single microcomputer, or may include a plurality of microcomputers.

Figure 3:
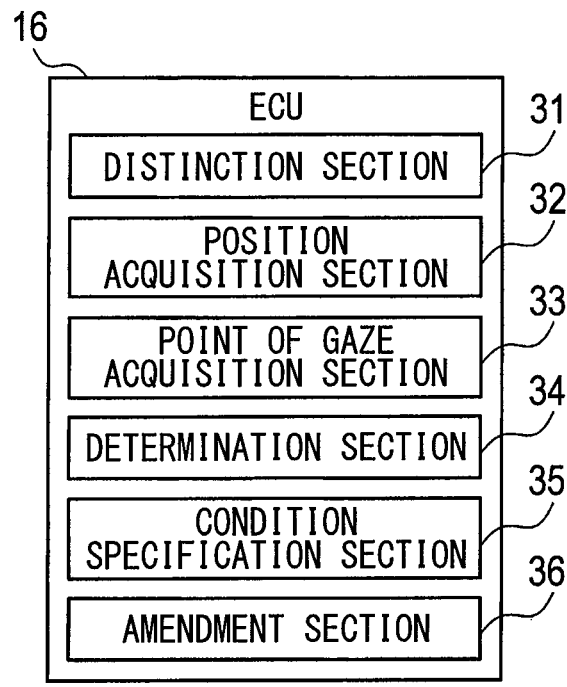
FIG. 3 is a block diagram for explaining a function of an ECU.

The ECU 16 includes a distinction section 31, a position acquisition section 32, a point of gaze acquisition section 33, a determination section 34, a condition specification section 35, and an amendment section 36, as the elements of functions achieved by the CPU 21 executing the program, as illustrated in FIG. 3. The technique of achieving those elements in the ECU 16 may not be limited to software programs. Part or all of those elements may also be achieved using hardware circuits combining a logic circuit and/or an analog circuit.

The distinction section 31 distinguishes which seat in the vehicle a manipulator 3 who manipulates the touch panel 12 is seated in. The present embodiment regards a driver seat and a passenger seat as targets for the distinction. It is noted that if the touch panel 12 is arranged to be manipulated by an occupant in a different seat other than the above driver seat or the passenger seat, the distinction section 31 may be configured to distinguish such an occupant who is seated in the different seat.

The position acquisition section 32 acquires an input position to the touch panel 12 which the manipulator 3 touches. In response to that the manipulator 3 touches the touch panel 12, an input signal is outputted from the touch panel 12. Based on the input signal, the position acquisition section 32 specifies a position on the touch panel 12 the manipulator 3 touches, as an input position.

The point of gaze acquisition section 33 acquires a point of gaze of the manipulator 3, a point of eye which is a position of the eyes of the manipulator 3, and a sight line of the manipulator 3, based on the signal outputted from the sight line detection device 13. The point of gaze of the manipulator 3 is defined as a position on the display screen of the display 11 which is specified as three-dimensional coordinates. The point of eye is specified as three-dimensional coordinates in the vehicle. The sight line is a straight line which connects the point of eye with the point of gaze.

The determination section 34 determines whether the input position of the touch panel 12 acquired by the position acquisition section 32 and the point of gaze of the manipulator 3 acquired by the point of gaze acquisition section 33 satisfy a predetermined amendment condition. In the present embodiment, the amendment condition is that the distance between the input position and the point of gaze is equal to or less than a predetermined threshold value.

Figure 4:
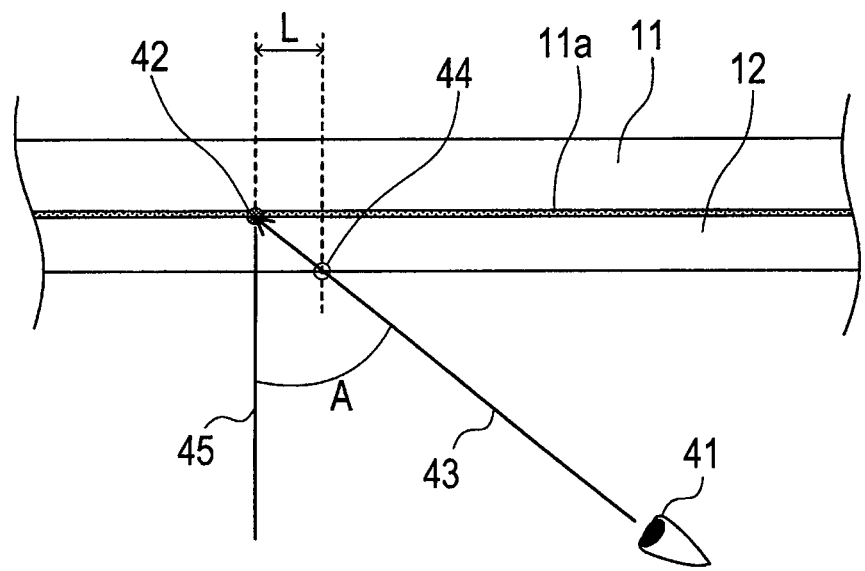
FIG. 4 is a schematic diagram for explaining a positional relation of a point of gaze etc. when seeing a display and a touch panel from an upper position or from a lateral position.

The condition specification section 35 specifies the amendment condition mentioned above. That is, the condition specification section 35 changes the threshold value mentioned above depending on the situation. The method of specifying the amendment condition will be explained using FIG. 4. The threshold value mentioned above is the distance L between (i) the point of gaze 42 and (ii) the intersection position 44 at which the sight line 43 intersects the front surface of the touch panel 12. In FIG. 4, the display screen 11a is existing in a boundary part of the display 11 with the touch panel 12.

The point of gaze acquisition section 33 acquires the sight line 43 which connects the point of eye 41 with the point of gaze 42. The memory 22 stores the distance to the front surface of the touch panel 12 from the front surface of the display 11 which faces the touch panel 12 (i.e., the display screen 11a of the display 11). From the above, the coordinates of the intersection position 44 is computable.

Even if the point of gaze 42 is identical, the intersection position 44 changes depending on the angle A formed between (i) the normal line 45 of the display 11 and (ii) the sight line 43. That is, the value of the distance L changes depending on the angle A. Then, the condition specification section 35 calculates the value of the distance L based on the acquired sight line 43 and specifies the calculated value as a threshold value of the amendment condition.

The amendment section 36 performs an amendment of the input position to the touch panel 12, to provide an amended input position. The content of the amendment changes depending on whether or not the amendment condition is determined to be satisfied by the determination section 34. When the amendment condition is satisfied, the input position is amended at least based on the detected point of gaze 42. In contrast, when the amendment condition is not satisfied, the input position is amended in a manner that reduces the degree of influence by the point of gaze as compared with the case where the amendment condition is satisfied. Such an amendment which reduces the degree of influence by the point of gaze 42 includes (i) an amendment that does not consider the point of gaze 42 and (ii) none of amendment (i.e., amendment amount being zero "0").

The above degree of influence by the point of gaze may be defined as a ratio of the point of gaze as a parameter influencing the amendment of the input position. In the following, an input position obtained by the amendment is referred to as an amended input position regardless of the presence or absence of the influence by the point of gaze.

The amended input position under the amendment condition being satisfied is closer to the point of gaze 42 than the amended input position under the amendment condition being not satisfied (i.e., than the input position that is not amended). In the present embodiment, in cases that the determination section 34 determines that the amendment condition is not satisfied, the amendment is made such that the point of gaze 42 is regarded as the amended input position. That is, the point of gaze 42 is used as it is as the amended input position.

Figure 5:
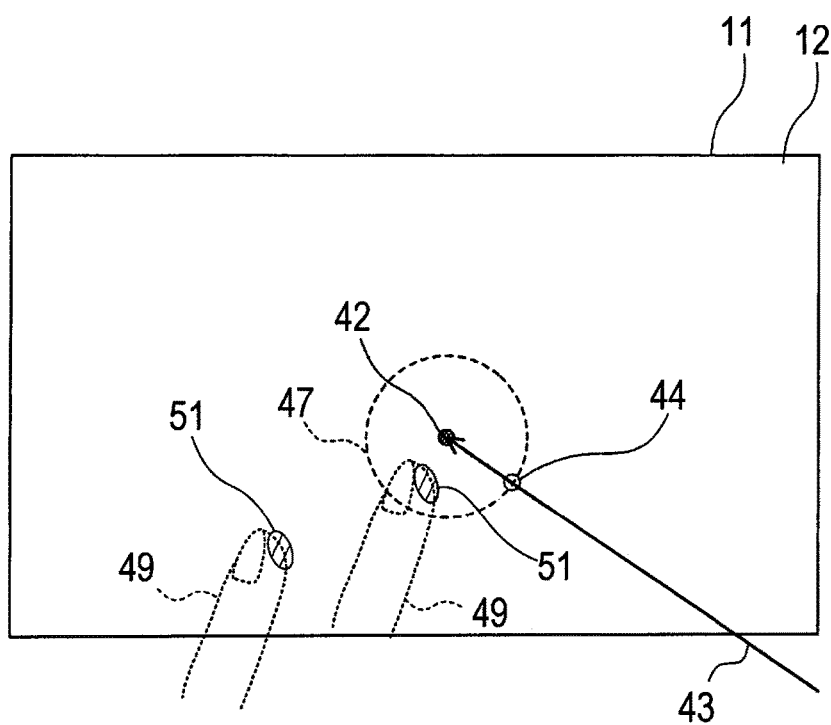
FIG. 5 is a schematic diagram for explaining an amendment range from a front view of a display and a touch panel.

FIG. 5 is a front view of the display 11 and the touch panel 12. In FIG. 5, for easily understanding, the distance between the point of gaze 42 and the intersection position 44 is illustrated to be sufficiently great. The amendment range 47 is defined as a circle centering on the point of gaze 42 with a radius of a distance L. In cases that the input position 51 by the finger 49 of the manipulator 3 is inside the amendment range 47, the distance between the point of gaze 42 and the input position 51 is less than the distance L, which satisfies the amendment condition. In contrast, in cases that the input position 51 by the finger 49 of the manipulator 3 is outside the amendment range 47, the amendment condition is not satisfied. Thus, the amendment condition may be differently defined such that the input position 51 is located within a predetermined range centering on the point of gaze 42.

The intersection position 44 is on the straight line which connects the point of gaze 42 with the point of eye 41 of the manipulator 3; when trying to touch the point of gaze 42, the manipulator 3 is apt to touch the intersection position 44. Therefore, when the intersection position 44 is touched, the processing is performed as supposing that the point of gaze 42 is touched. This enables an operation intended by the manipulator 3 to be achieved. The above amendment condition is a condition on which the amended input position turns into the position of the point of gaze 42 when the intersection position 44 is touched.

It is noted that the threshold value for the amendment condition may be specified to be greater than the distance L so as to allow the input position 51 to shift in the direction contrary to the point of gaze 42 from the intersection position 44. Further, the ECU 16 is configured to execute the various controls of the vehicle compartment environments or the running states, such as a screen display, navigation, music, or air-conditioning, depending on the input manipulation to the touch panel 12.

1-2. Process

Figure 6:
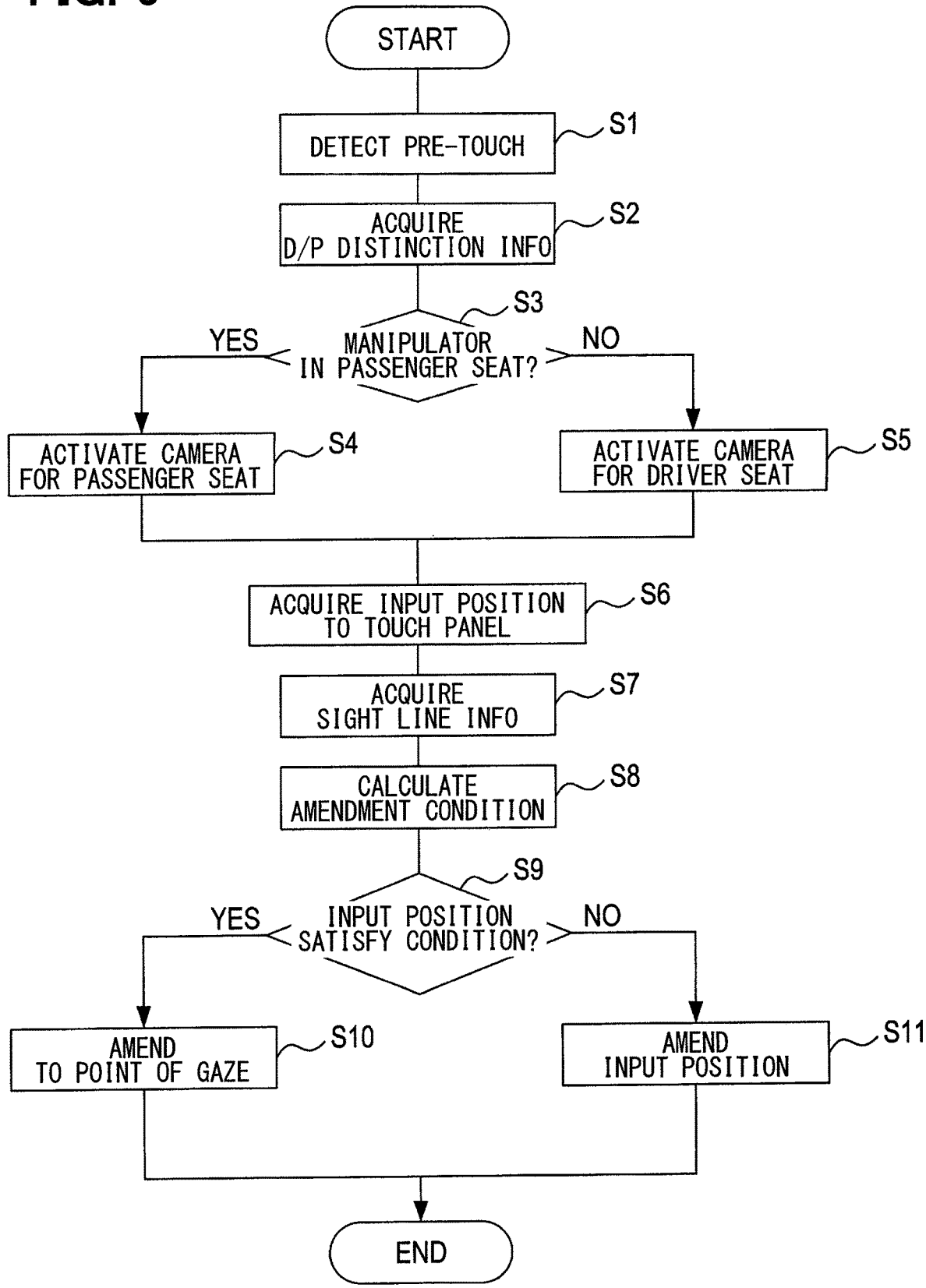
FIG. 6 is a flowchart of a position amendment process.

The following explains a position amendment process executed by the CPU 21 of the ECU 16 with reference to a flowchart in FIG. 6.

At S1, the CPU 21 performs a pre-touch detection and detects that a finger is approaching. The touch panel 12 can detect an approach of the finger of the manipulator 3 from the change in the electrostatic capacity, before the finger contacts the touch panel 12.

At S2, the CPU 21 acquires the information for distinguishing whether the manipulator 3 is a driver or a passenger from the distinction device 14. At S3, the CPU 21 determines whether the manipulator 3 is a passenger or not. If the manipulator 3 is a passenger, the sequence proceeds to S4. In contrast, when the manipulator 3 is not a passenger (i.e., if the manipulator 3 is a driver), the sequence proceeds to S5.

At S4, the CPU 21 activates the camera 18b for the passenger seat. At S5, the CPU 21 activates the camera 18a for the driver seat. At S6, the CPU 21 acquires an input position 51 to the touch panel 12 by the manipulator 3.

At S7, the CPU 21 acquires the information on the manipulator 3 such as a sight line 43, a point of gaze 42, a point of eye 41. At S8, the CPU 21 calculates a distance L as a threshold value for the amendment condition based on the input position 51 acquired at S6 and the point of gaze 42 acquired at S7.

At S9, the CPU 21 determines whether the input position 51 satisfies the amendment condition. If the input position 51 satisfies the amendment condition, the sequence proceeds to S10. In contrast, if the input position 51 does not satisfy the amendment condition, the sequence proceeds to S11.

At S10, the CPU 21 amends the input position 51 into the position of the point of gaze 42 as the amended input position. The present process is then ended. Due to the processing at S10, the ECU 16 regards an input manipulation as being made to the position of the point of gaze 42 and performs the subsequent processing.

Figure 7:
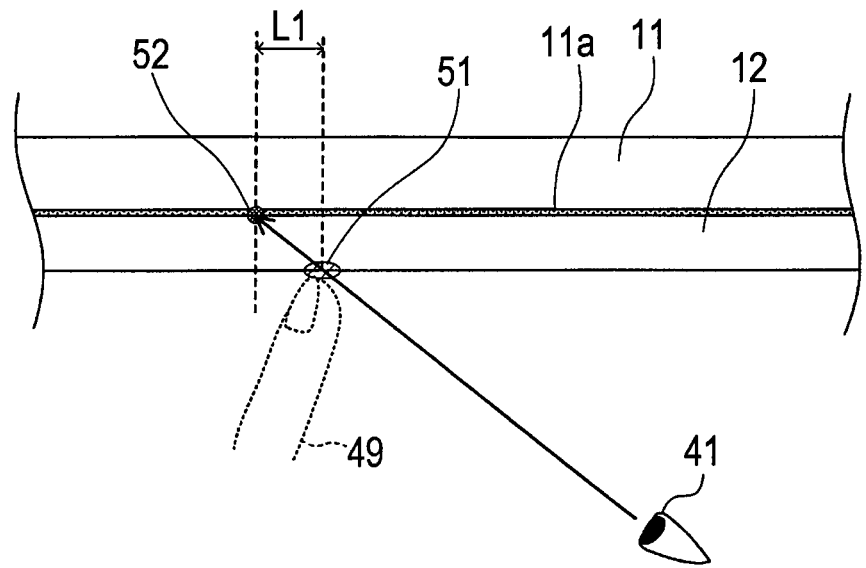
FIG. 7 is a schematic diagram for explaining a positional relation of a point of gaze etc. when seeing a display and a touch panel from an upper position or from a lateral position.

At S11, the CPU 21 amends the input position 51 without using the position of the point of gaze 42, as follows. With reference to FIG. 7, a straight line, which is defined as being between the point of eye 41 and the input position 51, is extended to the display 11. The CPU 21 calculates, as an estimated input position 52, a position at which the extended straight line intersects the display 11. The CPU 21 then uses the estimated input position 52 as the amended input position. The present process is then ended. Due to the processing at S11, the ECU 16 regards an input manipulation as being made to the estimated input position 52 and performs the subsequent processing.

1-3. Advantageous Effects

The first embodiment described above provides advantageous effects as follows.

(1a) The display system 1 of the present embodiment is provided as follows. In cases that the point of gaze 42 and the input position 51 satisfy the amendment condition (i.e., in cases that they are located within a distance L), the ECU 16 receives an input manipulation by using the point of gaze 42 of the manipulator 3 as the amended input position. This configuration can suppress the situation where the manipulator 3 views the display 11 from an oblique direction to cause a separation in between an actual input position 51 to the touch panel 12 and an intended input position to the touch panel 12, eventually disabling an input intended by the manipulator.

In addition, in cases that the point of gaze 42 is not close to the input position 51, the point of gaze 42 is not used as an amended input position for the input position 51. This configuration can suppress the situation where the manipulator 3 views a position very different from an input position 51 to cause an unintended input manipulation to be received.

(1b) The condition specification section 35 specifies the threshold value for the amendment condition to be greater as an angle A is greater; the angle A is formed by the normal line 45 of the display screen 11a of the display 11 and the sight line 43. Therefore, an appropriate condition may be specified according to the point of eye 41 of the manipulator 3.

2. Other Embodiments

Although the embodiments are described above, the present disclosure is not limited to the above embodiment and can be modified in various manners.

(2a) In the above embodiment, the shape of the display 11 or the touch panel 12 is not limited. One or both of the display 11 and the touch panel 12 may be formed to have a curved surface. For example, the curved surfaced touch panel may be arranged onto the flat surfaced display. In this case, a plate-shaped translucent member may be arranged between the display and the touch panel; of this member, an inner surface is flat surfaced along the display and an outer surface is curved surfaced along the touch panel.

(2b) The above embodiment indicates an example of the point of gaze 42 used as the amended input position on the condition that the distance between the point of gaze 42 and the input position 51 is less than a predetermined threshold value. The amendment condition mentioned above is not limited to the contents of the above embodiment.

For example, another amendment condition may be that the input position 51 and the point of gaze 42 are located within a predetermined range from the basis based on the point of gaze 42, or the intersection position 44. A concrete example, as illustrated in FIG. 8, may determine that the amendment condition is satisfied when the input manipulation is made within an amendment range 47a shaped of a circle centering on a center position 46 between the point of gaze 42 and the intersection position 44.

Such an amendment range may be defined as having an area that contains the intersection position 44 and the point of gaze 42. This amendment range enables the amendment to an incorrect manipulation, which takes place when the manipulator 3 intends to perform an input manipulation onto the position of the point of gaze 42.

Figure 8:
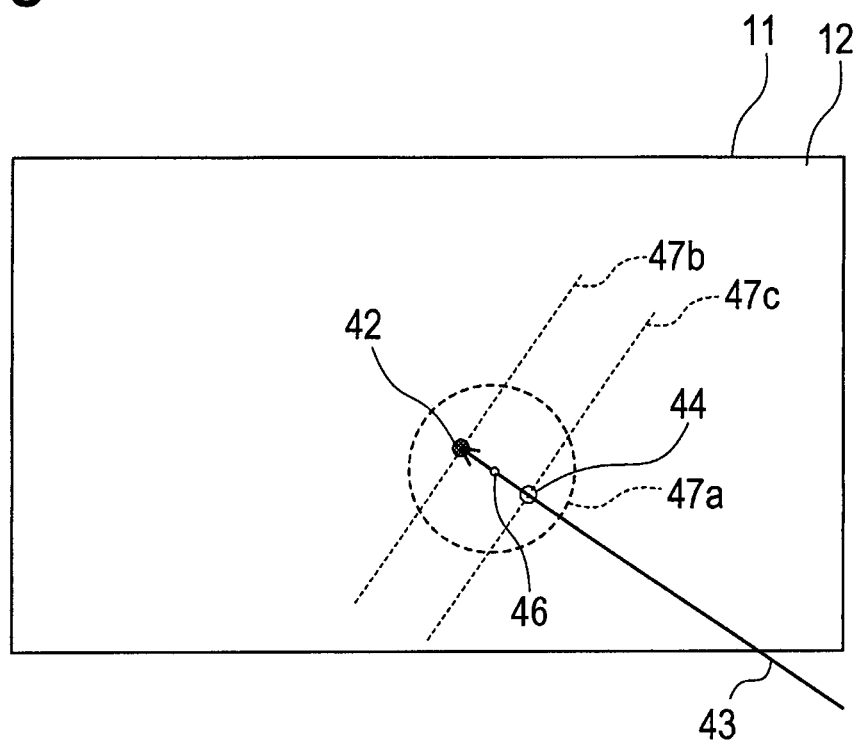
FIG. 8 is a schematic diagram for explaining an amendment range from a front view of a display and a touch panel.

Further, for instance, as illustrated in FIG. 8, it may be determined that the amendment condition is satisfied when a touch input is made to a region between a straight line 47b and a straight line 47c which are orthogonal to a straight line which connects the point of gaze 42 with the intersection position 44. The straight line 47b is a straight line which passes through the point of gaze 42; the straight line 47c is a straight line which passes through the intersection position 44.

Figure 9:
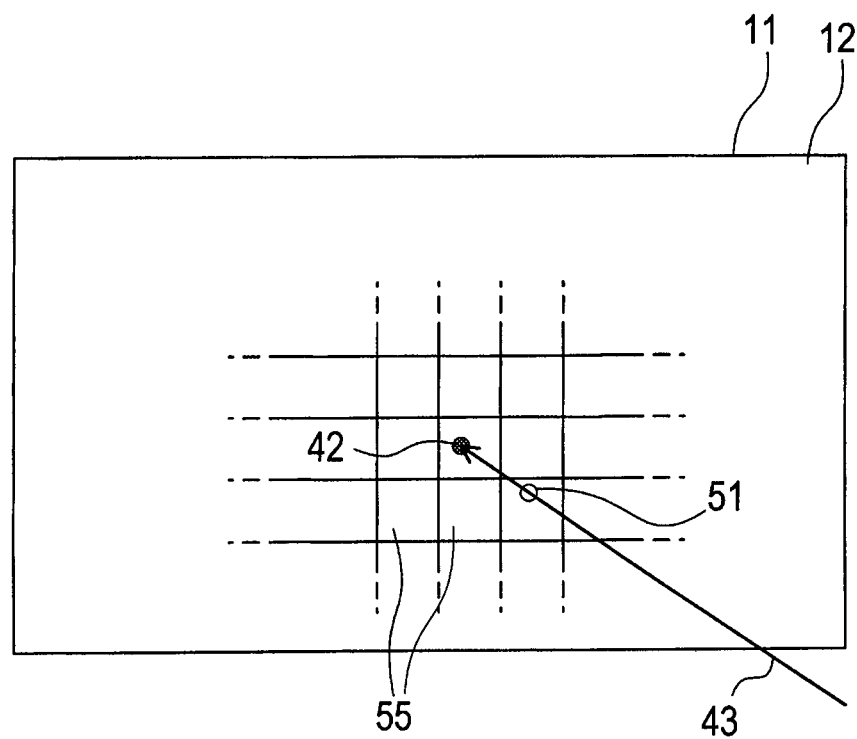
FIG. 9 is a schematic diagram for explaining an amendment range from a front view of a display and a touch panel.

Further, for instance, as illustrated in FIG. 9, the touch panel 12 may be divided into a plurality of rectangular blocks 55; an amendment range may be defined as several blocks previously assigned to a specific block in which either the input position 51 or the point of gaze 42 is located among the blocks 55. For example, only the specific block 55 may be defined as an amendment range; the specific block 55 together with several blocks 55 surrounding the specific block 55 may be defined as an amendment range. In addition, the number or magnitude of the several blocks 55 may be changed based on the angle of the sight line.

(2c) The determination as to whether the input position is to be amended may be made depending on not only whether one amendment condition relating to the input position 51 and the point of gaze 42 is satisfied but also whether a plurality of amendment conditions are simultaneously satisfied. For example, the ECU 16 may be configured to not perform an amendment based on the point of gaze 42 when the vehicle travel speed is a predetermined value or greater. In addition, the ECU 16 may be configured to perform an amendment only when a manipulator gazes at the display 11 a predetermined period of time or greater.

(2d) The detected position of the point of gaze 42 may be a position of the point of gaze 42 when the input manipulation is performed, or a position obtained based on the history of the position of the point of gaze 42 for a predetermined period of time before, after, or before and after the input manipulation. An example of the position of the point of gaze 42 for a predetermined period of time may be an arithmetical average of the point of gaze for 0.5 second just before an input manipulation, or weighted, or removed with obvious noise.

(2e) The above embodiment explains an example of the CPU 21 performing an amendment that uses the point of gaze 42 as the amended input position for the input position 51 at S10 in FIG. 6. The CPU 21 may perform another amendment based on the point of gaze 42 different from that of the above embodiment. For example, the CPU 21 may perform an amendment which uses a center position between the input position 51 and the point of gaze 42 as the amended input position. In addition, for instance, when several buttons are displayed to be adjacent to the display 11 and the input position 51 is adjacent to the boundary of the buttons, the CPU 21 may determine that the button adjacent to the point of gaze 42 is selected.

(2f) The above embodiment explains an example of the CPU 21 performing an amendment that is not based on the point of gaze 42 at S11 in FIG. 6. The CPU 21 may perform another amendment that uses the point of gaze 42 as an amendment that reduces an influence of the point of gaze 42 as compared with the case at S10. For example, the CPU 21 may use the point of gaze 42 as the amended input position for the input position 51 at S10; the CPU 21 may use the center position between the input position 51 and the point of gaze 42 as the amended input position for the input position 51. In addition, the CPU 21 may not need to perform any amendment at S11.

(2g) The above embodiment explains an example of specifying the threshold value for the amendment condition to be greater as an angle A is greater; the angle A is formed by the normal line 45 of the display screen 11a of the display 11 and the sight line 43. The above threshold value may be constant (i.e., the above threshold value may not need to change).

(2h) A function of one constituent element in the above embodiment may be distributed to a plurality of constituent elements; a plurality of functions of a plurality of constituent elements in the above embodiment may be integrated into one constituent element. In addition, one constituent may achieve a plurality of functions which a plurality of constituents have, or one constituent may achieve one function achieved by a plurality of constituents. In addition, a part of the configuration in the above embodiments may be omitted. In addition, at least a part of the configuration of each embodiment mentioned above may be added to or replaced by the configuration of another embodiment mentioned above. All the modes contained in a technical idea only identified from the terms described in claims are the embodiments of the present disclosure.

(2i) The present disclosure may be achieved by the various kinds of manners, in addition to the above ECU 16, such as the display system 1 including the ECU 16, a program for a computer to function as the ECU 16, a non-transitory tangible storage medium such as a semiconductor memory storing the program, or a method for input.

What is claimed is:

1. An information processing apparatus comprising:
    a position acquisition section configured to acquire an input position to a touch panel arranged on a display screen of a display apparatus which displays an image;
    a point of gaze acquisition section configured to acquire a point of gaze of a manipulator who performs an input manipulation to the touch panel;
    an amendment section configured to perform an amendment of the input position to the touch panel, to provide an amended input position;
    a determination section configured to determine whether a predetermined amendment condition is satisfied by the input position acquired by the position acquisition section and the point of gaze acquired by the point of gaze acquisition section; and
    a condition specification section configured to specify the amendment condition,
    wherein:
    the amendment condition includes at least one condition that a distance between the input position and the point of gaze is less than a predetermined threshold value;
    the condition specification section increases the predetermined threshold value as an angle increases, the angle being formed between (i) a sight line connecting the point of gaze with a point of eye of the manipulator and (ii) a normal line of the display screen at the point of gaze;
    in a first case that the determination section determines that the amendment condition is satisfied, the amendment section performs an amendment of the input position at least based on the point of gaze; and
    in a second case that the determination section determines that the amendment condition is not satisfied, the amendment section performs either
        (i) an amendment of the input position by reducing a degree of an influence of the point of gaze as compared with the first case that the determination section determines that the amendment condition is satisfied, or
        (ii) none of amendment of the input position.

2. The information processing apparatus according to claim 1, wherein
    in the first case that the determination section determines that the amendment condition is satisfied, the amendment section performs the amendment which employs the point of gaze as the amended input position.

3. The information processing apparatus according to claim 1, wherein:
    the display apparatus and the touch panel are mounted to a vehicle to be used;
    the information processing apparatus further comprising a distinction section configured to distinguish which seat the manipulator is seated on,
    wherein the point of gaze acquisition section acquires the point of gaze of the manipulator distinguished by the distinction section.

4. An information processing apparatus comprising:
    a position acquisition section configured to acquire an input position to a touch panel arranged on a display screen of a display apparatus which displays an image;
    a point of gaze acquisition section configured to acquire a point of gaze of a manipulator who performs an input manipulation to the touch panel;
    an amendment section configured to perform an amendment of the input position to the touch panel, to provide an amended input position;
    a determination section configured to determine whether a predetermined amendment condition is satisfied by the input position acquired by the position acquisition section and the point of gaze acquired by the point of gaze acquisition section; and
    a condition specification section configured to specify the amendment condition,
    wherein:
    the amendment condition includes at least one condition that the input position and the point of gaze are located at least within a predetermined range;
    the condition specification section specifies the predetermined range to be a range including (i) the point of gaze and (ii) an intersecting position at which a sight line intersects with a front surface of the touch panel, the sight line connecting the point of gaze with a point of eye of the manipulator;
    in a first case that the determination section determines that the amendment condition is satisfied, the amendment section performs an amendment of the input position at least based on the point of gaze; and
    in a second case that the determination section determines that the amendment condition is not satisfied, the amendment section performs either
        (i) an amendment of the input position by reducing a degree of an influence of the point of gaze as compared with the first case that the determination section determines that the amendment condition is satisfied, or (ii) none of amendment of the input position.

5. The information processing apparatus according to claim 4, wherein in the first case that the determination section determines that the amendment condition is satisfied, the amendment section performs the amendment which employs the point of gaze as the amended input position.

6. The information processing apparatus according to claim 4, wherein:

the display apparatus and the touch panel are mounted to a vehicle to be used;

the information processing apparatus further comprising a distinction section configured to distinguish which seat the manipulator is seated on, wherein the point of gaze acquisition section acquires the point of gaze of the manipulator distinguished by the distinction section.

7. The information processing apparatus according to claim 6, wherein in the first case that the determination section determines that the amendment condition is satisfied, the amendment section performs the amendment which employs the point of gaze as the amended input position.

8. A display system comprising:

a display apparatus configured to display an image;

a touch panel arranged to a display screen of the display apparatus;

a point of gaze detection apparatus configured to detect a point of gaze of a manipulator who performs an input manipulation to the touch panel; and an information processing apparatus configured to execute a predetermined control according to the input manipulation to the touch panel, the information processing apparatus comprising:

a position acquisition section configured to acquire information indicating an input position to the touch panel from the touch panel;

a point of gaze acquisition section configured to acquire information indicating the point of gaze of the manipulator from the point of gaze detection apparatus;

an amendment section configured to perform an amendment of the input position to the touch panel, to provide an amended input position;

a determination section configured to determine whether a predetermined amendment condition is satisfied by the input position acquired by the position acquisition section and the point of gaze acquired by the point of gaze acquisition section; and a condition specification section configured to specify the amendment condition, wherein:

the amendment condition includes at least one condition that a distance between the input position and the point of gaze is less than a predetermined threshold value;

the condition specification section increases the predetermined threshold value as an angle increases, the angle being formed between (i) a sight line connecting the point of gaze with a point of eye of the manipulator and (ii) a normal line of the display screen at the point of gaze;

in a first case that the determination section determines that the amendment condition is satisfied, the amendment section performs an amendment of the input position at least based on the point of gaze; and in a second case that the determination section determines that the amendment condition is not satisfied, the amendment section performs either (i) an amendment of the input position by reducing a degree of an influence of the point of gaze as compared with the first case that the determination section determines that the amendment condition is satisfied, or (ii) none of amendment of the input position.

* * * * *